W. M. GROSVENOR.
APPARATUS FOR ASCERTAINING THE PROPERTIES OF FLUIDS.
APPLICATION FILED JULY 11, 1914.
1,236,706.
Patented Aug. 14, 1917.
2 SHEETS—SHEET 1.
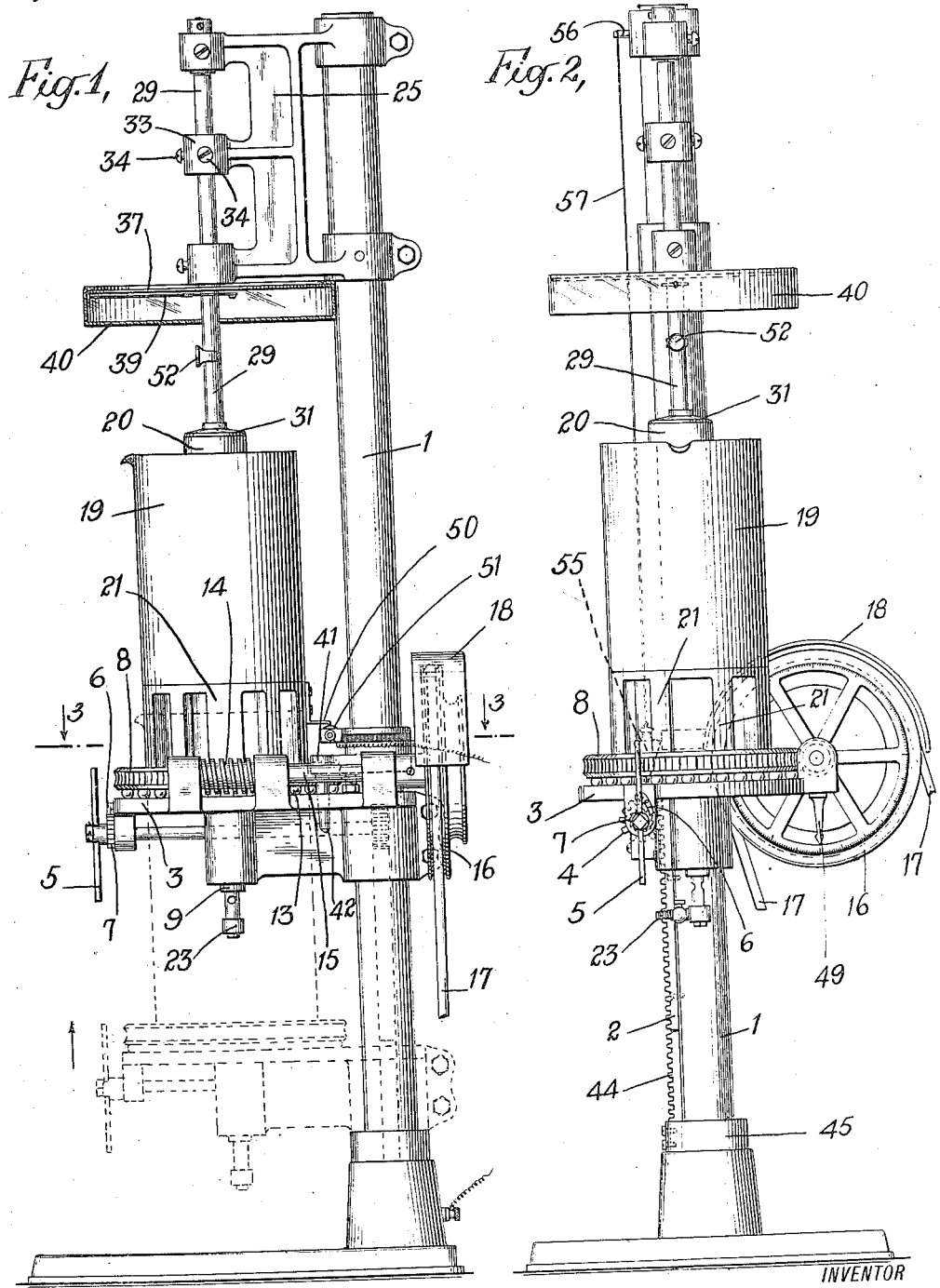
WITNESSES
Geo. M. Harris
John O. Templer
INVENTOR
William M. Grosvenor
BY Kenyon & Kenyon
ATTORNEYS

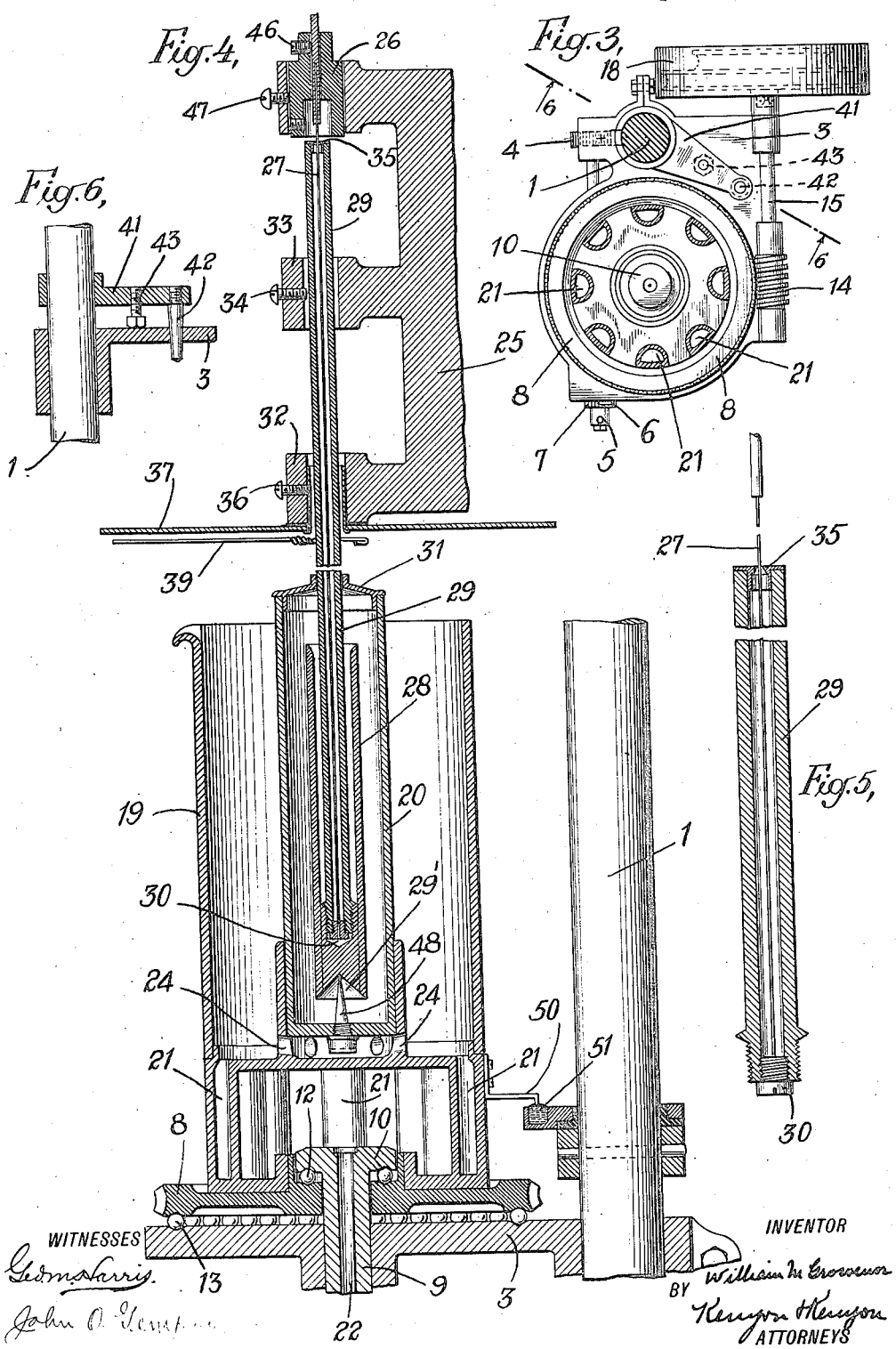

UNITED STATES PATENT OFFICE.

WILLIAM M. GROSVENOR, OF RIDGEWOOD, NEW JERSEY, ASSIGNOR TO PERKINS GLUE COMPANY, A CORPORATION OF PENNSYLVANIA.

APPARATUS FOR ASCERTAINING THE PROPERTIES OF FLUIDS.

1,236,706.  Specification of Letters Patent.  Patented Aug. 14, 1917.

Application filed July 11, 1914. Serial No. 850,330.

*To all whom it may concern:*

Be it known that I, WILLIAM M. GROSVENOR, a citizen of the United States, and a resident of Ridgewood, in the county of Bergen, State of New Jersey, have invented certain new and useful Improvements in Apparatus for Ascertaining the Properties of Fluids, of which the following is a specification.

The invention relates to improvements in apparatus for ascertaining the properties of fluids, by which is meant to be included solid suspensions, highly viscous colloids, gelatinous and semi-fluid solids and the like. The properties more particularly desirable to ascertain are viscosity, elasticity and solidity and the change of viscosity with change of speed of flow, as well as elastic fatigue.

What is generally considered the viscosity of a liquid appears not to be true viscosity (varying as a right linear function of the rate of translation $\frac{dx}{dt}$), but varying as a curvilinear function, and this small deflection from true viscosity (even below what are called "critical velocities") is believed to be dependent upon the homogeneity of the fluids, and that, therefore, it is important to determine viscosities at accurately known velocities or speeds and at a series of different velocities. Also, for comparing viscosities of different liquids, precisely the same velocities should be used. Therefore, it is highly desirable to equate mathematically or graphically the variations of viscosity with velocity and by interpolation ascertain the viscosities at definite speeds for comparison. To do this, no one of the so-called flow, gravity, shot-drop, or torsion viscosimeters is suitable, there being no known instrument that does not involve, at different points of contact with the fluid or during different times of the measurement, variations of velocity that prevent the accurate determination of viscosities at any single velocity.

In carrying out the present invention in its preferred form, there is provided a viscosimeter which consists of a rotating container for the liquid to be examined, capable of being rotated at different substantially constant speeds, with a cylinder suspended by a wire capable of torsional deflection by the rotative effect of the liquid, and provided with a suitable index for indicating the amount of torsional deflection produced. The ends of the cylinder offer an instance of the objectionable variation in velocity (from center to circumference) which can be substantially eliminated by making the two ends of the cylinder deeply recessed with sharp edges, so that at the top any slight excess of liquid flows into the recess and the top end is exposed to the air, and the air trapped or inserted in the bottom recess makes the liquid-contact surface substantially a cylinder without ends.

Further objects, features and advantages will more clearly appear from detailed description given below, taken in connection with the accompanying drawings, which form a part of this specification.

In the drawings,

Figure 1 is a side elevation of an apparatus embodying the invention in one form;

Fig. 2 is an elevation of the same taken at right angles to Fig. 1;

Fig. 3 is a horizontal section taken on the line 3—3 of Fig. 1;

Fig. 4 is a vertical section of parts of the apparatus;

Fig. 5 is a detail of parts of the suspension; and

Fig. 6 is a detail section taken on the line 6—6 of Fig. 3.

Referring to the various figures, 1 represents a suitable supporting post, having fixed on one side of its lower portion a rack 2. Slidable up and down on the post 1 is a table 3, carrying a pinion 4, operated by a handle 5, which pinion engages with the teeth of the rack 2. A pawl 6, carried upon the table 3, is adapted to engage the teeth of a ratchet 7, in order to maintain the table in its raised position. Carried upon the table 3 is a turntable 8, adapted to rotate about a central stud 9, extending through the table 3, and having a head 10 on its upper end, ball bearings 12 and 13 being provided between the head 10 and the table 8 and the table 3 and table 8 respectively. The table 8 is provided with gear teeth on its periphery, engaged by a worm 14 on a shaft 15, having fixed on its outer end a pulley 16, which may be driven in any suitable manner, as by a belt 17, from any suitable source of power adapted to drive the table 8 at various but constant fixed speeds. The pulley 16 is provided with a guard 18, extending over the top thereof, and, together with the shaft 15, worm 14 and table 8, is adapted to be raised and lowered with the table 3.

Removably secured and carefully centered upon the top of the table 8 is a cylindrical vessel 19, having also removably secured therein and carfully centered therein a cylindrical container 20. The space between the outside of the container 20 and the inside of the vessel 19 acts as a jacket for heating or cooling water or other fluid. At its lower end, the vessel 19 is provided with hollow legs 21, and the central stud 9 is provided with a central passage 22, through which a flame or hot gases from a burner 23 may pass to the underneath side of the vessel 19 and so, if desired, heat the water or other fluid in the legs 21 and vessel 19. Passages 24 are provided underneath the cylindrical container 20, in order to provide free circulation for the heating or cooling fluid.

Carried upon the upper end of the post 1, is a frame 25, in the upper end of which is carried a block 26, having a central vertical passage in which is secured the upper end of a suspension having a torsional wire 27. Situated centrally in the cylindrical container 20 is a solid body 28, having a cylindrical outer surface. The cylindrical body 28 is relatively long as compared with its diameter in order that, should the fluid examined contact with the ends of the cylinder, the area of such contact is minimized. The body 28 is deeply recessed on its bottom face, as at 29′, and is also deeply recessed at its top, so as to provide a substantially hollow cylinder. Extending down into this hollow cylinder 28 is a hollow rod 29, screwthreaded into the bottom portion of the cylinder 28. The torsion wire 27 is secured in the bottom end of the hollow tube 29, as by means of a nut 30. The hollow rod 29 passes loosely through a split cap 31, forming a cover for the container 20, and also passes loosely through guides 32 and 33 on the frame 25. Screws 34 are provided in the guide 33 for adjusting the limits of guidance of the rod 29. Secured in the top of the rod 29 is a split bushing 35, having a small central aperture, through which the wire 27 loosely passes.

Secured to the guide 32, as by a screw 36, is a fixed index plate 37, having index characters thereon, coöperating with a pointer 39 adjustably and removably secured to the rod 29. Surrounding the underneath side of the index plate 37 and pointer 39, is a casing 40, which may be of transparent material, and which is for the purpose of preventing the pointer being affected by air currents or the like.

In order that the table 3, and consequently the table 8 carried thereby, may be carefully centered when it is raised, there is provided, rigidly secured to the post 1, a bracket 41, carrying a tapered plug 42 and a set-screw 43 on its underneath side. When the table has been raised to the desired predetermined height, the table 3 engages the set-screw 43, which acts as an adjustable stop therefor, and, at the same time, the tapered plug 42 snugly engages a coöperating hole in the table 3, so that the latter is accurately and rigidly centered. When the table 3, with the parts supported thereby, is lowered, it will be seen that, with the cover 31 removed, the cylinder 20 will be withdrawn from the cylinder 28. When the table 3 is at its lower position, as shown in dotted lines in Fig. 1, the pinion 4 engages a rack 44, which is secured to a collar 45, rotatively mounted upon the post, 1, so that, when in this position, the table 3, together with the rack 44, may be oscillated about the post 1. Thereupon, when the table 3, with its supported parts, is lowered and moved about the post 1 from beneath the cylinder 28, the vessel 19, with the container 20, may be removed from the table 8 and emptied or filled, as desired. Also, the container 20 may be removed without removing the vessel 19.

When it is desired to assemble the apparatus for operation, the wire having the proper torsional value for measuring the properties of the particular liquid is selected and its lower end secured in the bottom end of the rod 29, as by means of nut 30. The bushing 35 is then placed around the end of the wire extending through the rod 29, and the end of the suspension secured in the block 26 by means of screw 46, the block 26 being securely held in adjusted position by means of the screw 47. Thereupon the solid cylindrical body 28 is screwed upon the lower end of the rod 29, as clearly shown in Fig. 5. Then the table 3, with its supported parts, is raised until it engages the screw 43 and pin 42, as above described. Thereupon screw 46 is loosened and the suspension lowered until the lower end of the body 28 just engages the point of a pin 48, which pin is screwthreaded through the lower end of the container 20. This gives the proper vertical adjustment for the suspended parts, and the screw 46 is tightened up to retain them in this position. The table 3 is then lowered, the container 20 removed, and the pin 48 taken out, and a similar pin inserted without any point, or any other suitable plug inserted to fill the screw threaded aperture in the bottom of the container 20. The liquid, the properties of which it is desired to ascertain, is then placed in the container 20 and the parts raised, as shown in Fig. 4, the cover 31 being finally inserted in place.

Obviously, any suitable suspension may be used and all such suspensions are intended to be included in the term "torsional suspension." In order that the apparatus may be adjusted accurately vertical, a plumb bob 55 (Fig. 2), coöperating with a point on the table 3, is suspended from the top of the apparatus at 56, as by a wire 57.

The operation of the apparatus may be described as follows:

First, if it is desired to determine the solidity of the fluid or semi-solid or the like, the pulley 16 is given a definite movement with respect to the pointer 49, which is fixed with respect to the table 3. This imparts a predetermined movement to the rotary table 8, causing the container 20 to be moved through a definite arc of rotation. The apparatus is then brought to a stop and there held. According to the solidity of the fluid or semi-solid, the body 28 will be dragged about for a certain distance, thus causing a certain movement of the pointer 39 with respect to the index on scale 37. The time which it takes for the pointer 39 to reach its final position and the differences in the arc through which the container 20 is turned and the pointer 39 is moved serve to indicate the solidity of the material.

Now, if it is desired to measure the elasticity of the fluid or the like, the pulley 16 is returned to its original position, thus returning the table 8 and container 20 to their original positions, whereupon the elastic force stored up in the fluid by the previous distortion will be indicated by the angle to which the pointer 39 is carried beyond the zero to which it would be expected that the pointer should return.

Now, if it is desired to measure the viscosity of the fluid or the like, it is best to measure the viscosities at several different velocities or speeds of rotation of the container 20 above and below the desired speed which is accepted as standard. Assume that the standard speed is that corresponding to one revolution of the container 20 in six seconds. The pulley 16 will be rotated at such a speed, for example, as to give the container 20 one rotation in four seconds, one rotation in five and one-half seconds, one rotation in five and three-quarters seconds, and one rotation in seven seconds, without making any special effort to adjust the speed to any precise constant value, but carefully determining in each case the exact speed of rotation and the corresponding deflection of the pointer 39. By plotting or by calculation, the deflection which would have been produced at the precise speed of one revolution in six seconds can be interpolated. The torsional constants of the wire, the diameter of the body 28, its length and the diameter of the vessel 20 being known, the viscosity or force required to slide two solid surfaces with the fluid in between, which surfaces are one centimeter square and one centimeter apart, past one another with a velocity of one centimeter per second can be calculated.

Ordinarily speaking, however, viscosities are expressed relative to the viscosity of water, in which case, by comparing successive wires which can easily be inserted in the instrument, from the finest wire adapted to use with water to the heaviest wires adapted for use with pitch, to determine fixed constants for the different wires, a direct comparison may be made between the viscosity of all fluids, no matter how viscous, with water.

In the previous preferred method of determining viscosity at exact speed, the necessary data have already been obtained for comparing viscosities at various speeds and determining the change of viscosity with certain changes in speed.

It will be understood that the recess at the bottom of the body 28 is practically filled with air and that the level of the fluid in the container comes to the top of the body 28, any excess flowing into the recess in the top of the body 28, so that the main body of the fluid does not contact with ends of the cylinder 28 and cause errors in the measurements.

For precise determination of speeds, finger 50 is provided, secured to the vessel 19, adapted to engage with a mercury globule 51 carried upon but insulated from the post 1, so that, whenever the pointer 50 engages the globule 51 once during each rotation of the container 19, an electrical circuit may be closed, which may be made to operate a signal or recording instrument for recording the revolutions per second of the vessel 19 and container 20, such as a recording chronometer.

For precise determination of angular movement of the rod 29, carrying the pointer 39, a mirror 52 may be secured to the rod 29 and beams of light reflected therefrom and the angular movement of these beams accurately determined by well-known methods.

If it is desired to make any of these measurements at different temperatures, the fluid may be raised to the desired temperature by means of the heating jacket arrangement above described, provided with any of the well-known means for accurate control of the temperature and agitation of the heating or cooling fluid to cause the temperature to be uniform throughout the fluid examined.

Having fully and clearly described the invention with respect to the preferred embodiment thereof, what is claimed and desired to be secured by Letters Patent is:—

1. Apparatus for ascertaining the properties of liquids or the like, having in combination a container for the liquid, a turntable upon which said container is removably supported, means for rotating said turntable at a constant definite speed, a solid body suspended in the liquid in the container, a torsional suspension for suspending said body in the liquid, and means for measuring the angular movement of said body produced by the rotation of the liquid in the container.

2. Apparatus for ascertaining the properties of liquids or the like, having in combination a container for the liquid, means for rotating the container, a solid body, means for suspending said body in the liquid in the container, said body having a cylindrical outer surface with a recessed bottom adapted to inclose a volume of air to prevent contact of the liquid with the bottom of the body, and means for measuring the rotative effect of the liquid on said body.

3. Apparatus for ascertaining the properties of liquids or the like, having in combination a container for the liquid, a turntable upon which said container is removably supported, means for rotating said turntable at a constant definite speed, a solid body suspended in the liquid in the container, said body having a cylindrical outer surface and said container having a cylindrical inner face, a torsional suspension for suspending said body in the liquid, and means for measuring the angular movement of said body produced by the rotation of the liquid in the container.

4. A viscosimeter comprising a base, a bearing thereon, a container-support on said bearing, a container removably seated on said support and adapted to contain the substance to be tested, a body arranged for immersion in the substance, a torsion element removably secured at its upper end and adapted to suspend said body, means for rotating said container-support, and means for indicating the deflection of the body.

5. A viscosimeter comprising a base, a bearing thereon, a container-support on said bearing, a container removably seated on said support and adapted to contain the substance to be tested, means for heating the substance, a body arranged for immersion in the substance, a torsion element removably secured at its upper end and adapted to suspend said body, means for rotating said container-support, and means for indicating the deflection of the body.

In testimony whereof, I have signed my name to this specification, in the presence of two subscribing witnesses.

WILLIAM M. GROSVENOR.

Witnesses:
Jos. F. X. Harold,
Edwin Seger.